(12) United States Patent
Oh et al.

(10) Patent No.: US 7,876,511 B2
(45) Date of Patent: Jan. 25, 2011

(54) SUBMINIATURE IMAGING OPTICAL SYSTEM

(75) Inventors: Hye Ran Oh, Gyunggi-do (KR); In Cheol Chang, Gyunggi-do (KR); Seok Cheon Lee, Gyunggi-do (KR); Young Su Jin, Seoul (KR); Cheong Hee Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 171 days.

(21) Appl. No.: 12/222,519

(22) Filed: Aug. 11, 2008

(65) Prior Publication Data

US 2009/0040626 A1    Feb. 12, 2009

(30) Foreign Application Priority Data

Aug. 10, 2007   (KR) ............... 10-2007-0080449

(51) Int. Cl.
*G02B 9/00*   (2006.01)
*G02B 13/18*  (2006.01)

(52) U.S. Cl. ............... 359/797; 359/796; 359/718

(58) Field of Classification Search .......... 359/796, 359/797, 741, 718
See application file for complete search history.

(56) References Cited

U.S. PATENT DOCUMENTS

| | | | |
|---|---|---|---|
| 6,141,153 A * | 10/2000 | Hendriks | ............ 359/641 |
| 6,995,928 B2 | 2/2006 | Saito | |
| 2004/0114057 A1 | 6/2004 | Yoon et al. | |
| 2005/0275954 A1* | 12/2005 | Bloemen et al. | ............ 359/719 |
| 2006/0056067 A1* | 3/2006 | Yanai et al. | ............ 359/754 |
| 2007/0103791 A1* | 5/2007 | Hankawa et al. | ............ 359/680 |
| 2007/0146897 A1* | 6/2007 | Hozumi et al. | ............ 359/680 |

FOREIGN PATENT DOCUMENTS

| | | |
|---|---|---|
| JP | 2001-324609 | 11/2001 |
| KR | 10-2005-0093755 | 9/2005 |

\* cited by examiner

*Primary Examiner*—Jordan M. Schwartz

(57) ABSTRACT

There is provided an imaging optical system including: a first lens element having a convex object-side surface; a second lens element having an object-side planar surface in contact with an image-side surface of the first lens element and an image-side planar surface; and a third lens element having an object-side surface in contact with an image-side surface of the second lens element, wherein the object-side surface of the first lens element and an image-side surface of the third lens element are aspherical, and the third lens element has a point of inflection formed within an effective aperture thereof such that the image-side surface is convexed toward an image plane at a central portion to have positive refractive power and concaved toward the image plane at a peripheral portion to have negative refractive power.

7 Claims, 2 Drawing Sheets

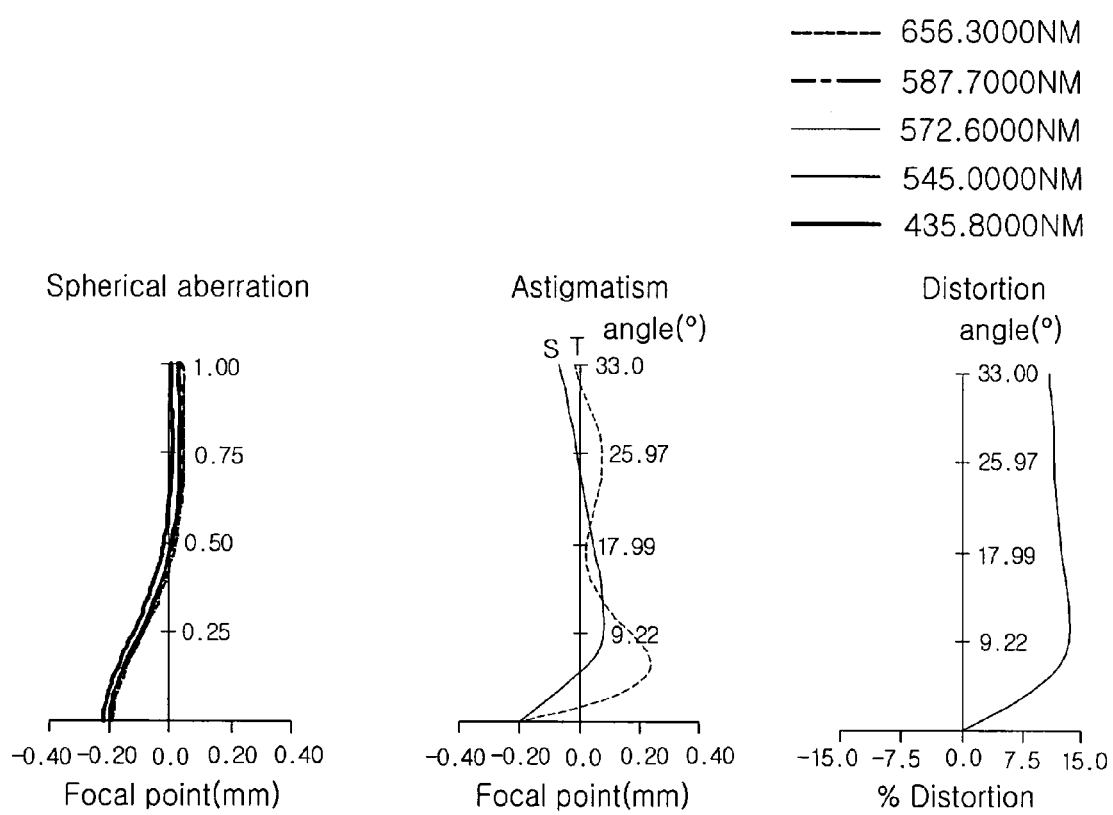

SUBMINIATURE IMAGING OPTICAL SYSTEM

CROSS-REFERENCE TO RELATED APPLICATIONS

This application claims the priority of Korean Patent Application No. 2007-0080449 filed on Aug. 10, 2007, in the Korean Intellectual Property Office, the disclosure of which is incorporated herein by reference.

BACKGROUND OF THE INVENTION

1. Field of the Invention

The present invention relates to a subminiature imaging optical system, and more particularly, to subminiature imaging optical system installed in a mobile communication terminal and a personal digital assistant (PDA) to increase resolution at a peripheral portion and decrease distortion for better resolution, maintains lens shape and optical properties stably even in a high temperature assembly process, and effectively block incidence of a light portion outside an effective angle of view to improve axial aberrations and be manufactured at a low cost.

2. Description of the Related Art

In general, mobile communication terminals had only functions of basic communication at their incipient stage. However, with increased use, the mobile communication terminals are required to have diversified functions ranging from photographing to image transmission and video communication, continuously evolving in their functions and services. Recently, a new expanded concept of mobile communication terminal by integrating digital camera technology with mobile phone technology, i.e., so called camera phones or camera mobile phones are significantly attracting attention.

In particular, the imaging optical system mounted on the camera phone is not only required to be miniaturized, lightweight and low-cost, but also have high resolution since the pixel size of an image sensor formed of a charge coupled device (CCD) or a complementary metal oxide semiconductor (CMOS) used in the imaging optical system is decreasing.

In order to satisfy miniaturization and low cost, the imaging optical system mounted on a small device such as a mobile phone needs to have lenses of as small a number as possible, but this restricts a degree of freedom in designing and undermines the optical capabilities.

Especially, in the conventional imaging optical system, an aperture stop is disposed in an area other than lenses to adjust a light amount, thereby hindering reduction in size and weight of the optical system.

Therefore, there is a demand for a subminiature imaging optical system which can be reduced in size and weight, while having high resolution and excellent aberrational characteristics.

Moreover, when the imaging optical system is assembled at a high temperature to be employed in a camera module having the image sensor mounted thereon, the lens made of plastic is altered in shape and accordingly optical properties, thereby degrading optical properties of the camera module.

SUMMARY OF THE INVENTION

An aspect of the present invention provides a subminiature optical system which is improved in resolution deterioration at a peripheral portion caused by severe astigmatism at edges of an image and reduces TV distortion to increase resolution.

An aspect of the present invention also provides a subminiature optical system capable of maintaining lens shape and optical properties even in a high temperature assembly process and being manufactured at a low cost.

An aspect of the present invention also provides a subminiature optical system capable of effectively blocking incidence of a light portion outside an effective angle of view to enhance image quality.

According to an aspect of the present invention, there is provided a subminiature imaging optical system including: a first lens element having a convex object-side surface; a second lens element having an object-side surface in contact with an image-side surface of the first lens element; and a third lens element having an object-side surface in contact with an image-side surface of the second lens element, wherein the object-side surface of the first lens element and an image-side surface of the third lens element are aspherical, and the third lens element has a point of inflection formed within an effective aperture thereof such that the image-side surface is convexed toward an image plane at a central portion to have positive refractive power and concaved toward the image plane at a peripheral portion to have negative refractive power.

The subminiature imaging optical system may satisfy following condition 1, and include at least one point satisfying $\Delta sag/\Delta r=0$, $$r>0.7*r_{S2} \qquad \text{condition 1,}$$

where r is a radius on an optical axis, $r_{S2}$ is an effective radius of the image-side surface of the third lens element and sag is a height between the radius r and a length in an optical axis direction when a meeting point between the image-side surface of the third lens and the optical axis serves as the point of origin.

The first and third lens elements may be formed of polymer by a replica process and the second lens element is formed of glass.

The first and third lens elements may be formed of a high heat-resistant ultra violet curing polymer.

The second lens element may have a light blocking portion disposed at the image-side surface.

The light blocking portion may satisfy following condition 2, $$r_{W2}-0.01<R<r_{S2'}-0.02 \qquad \text{condition 2,}$$

where $r_{W2}$ is an effective radius of the image-side surface of the second lens element, R is a radius of a central hole formed in the light blocking portion, and $r_{S2'}$ is an r value greater than the effective radius when the image-side surface of the third lens element satisfies $\Delta sag/\Delta r=0$.

The second lens element may have a filter disposed at one of the object-side surface and image-side surface of the second lens element.

BRIEF DESCRIPTION OF THE DRAWINGS

The above and other aspects, features and other advantages of the present invention will be more clearly understood from the following detailed description taken in conjunction with the accompanying drawings, in which:

FIGS. 2A to 2C are aberrational diagrams illustrating the embodiment shown in FIG. 1, in which FIG. 2A represents spherical aberration, FIG. 2B represents astigmatism and FIG. 2C represents distortion.

DETAILED DESCRIPTION OF THE PREFERRED EMBODIMENT

Figure 1:
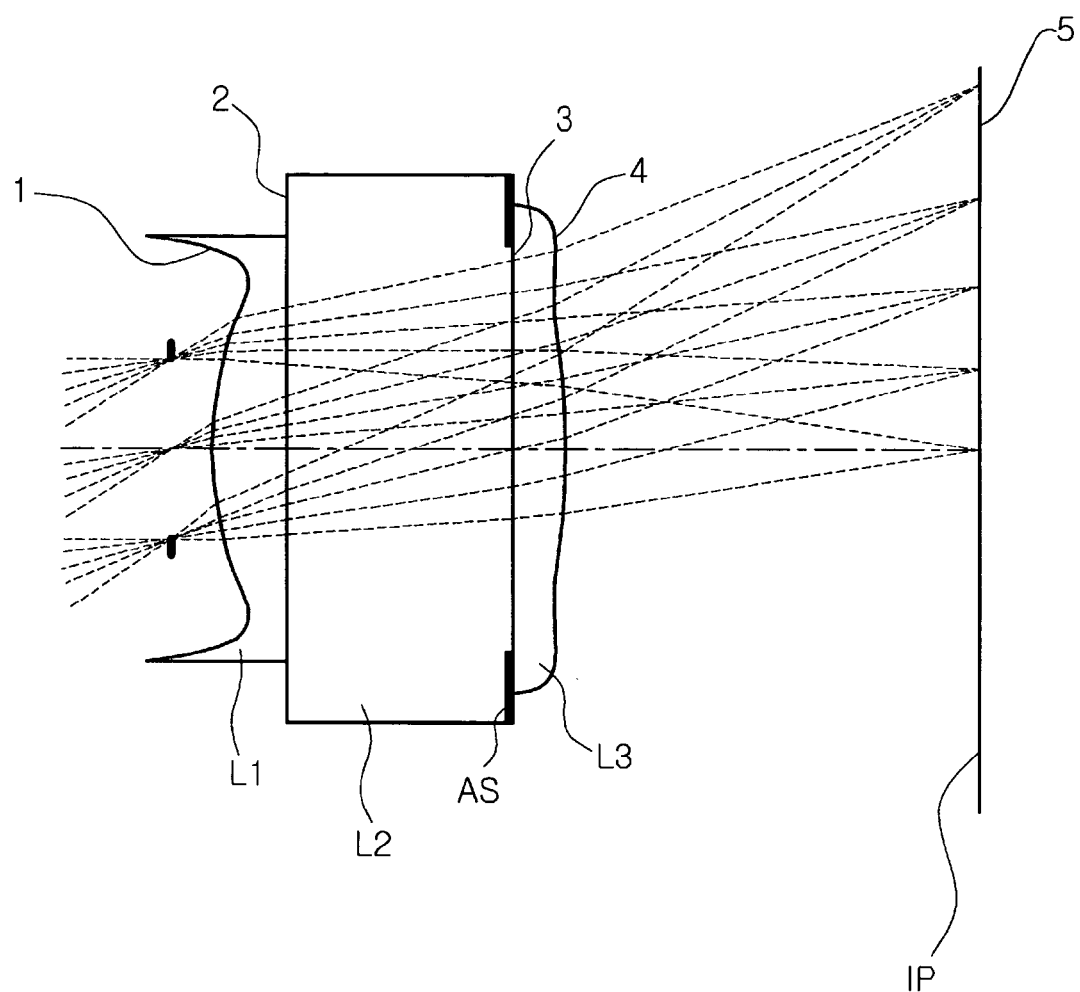
FIG. 1 is a lens configuration view illustrating a subminiature imaging optical system according to a first embodiment of the invention.

Exemplary embodiments of the present invention will now be described in detail with reference to the accompanying drawings.

FIG. 1 is a lens configuration view illustrating a subminiature imaging optical system according to a first embodiment of the invention. In the following lens configuration views, the thicknesses, sizes and shapes of the lenses may be exaggerated for clarity. In particular, the shapes of spherical or aspherical surfaces shown in the views are only exemplary and should not be construed as limiting.

As shown in FIG. 1, the subminiature imaging optical system of the present embodiment includes, sequentially from an object side, a first lens element L1, a second lens element L2, a third lens element L3 and an image sensor (not shown) corresponding to an image plane.

The first lens element L1 has a convex object-side surface 1. The second lens element L2 has an object-side surface 2 in contact with an image-side surface of the first lens element L1. The third lens element L3 has an object-side surface 3 in contact with an image-side surface of the second lens element L2.

In the present embodiment, the object-side surface of the first lens element L1 and an image-side surface of the third lens element L3 are aspherical.

Here, a ring-shaped light blocking portion AS may be provided at the image-side surface 3 of the second lens element L2 to adjust a light amount and block light. In the present embodiment, the light blocking portion AS is disposed at the image-side surface 3 of the second lens element L2, but not limited thereto.

The light blocking portion AS may be formed of a metal film using e.g., aluminum (Al) or chrome (Cr). Alternatively, the light blocking portion AS may be integrally formed on the object-side surface 2 or the image-side surface 3 of the second lens element L2 corresponding to a glass substrate by utilizing a photo resist such as a black photo resist.

Here, a photo resist refers to a polymer or a polymer composition altered in a molecular structure due to optical function and subsequently in physical properties thereof.

The photo resist as described above is chiefly formed of a polymer, a solvent and a sensitizer, and divided into a positive photo resist and a negative photo resist depending on type of development. The positive photo resist has an exposed portion removed after development whereas the negative photo resist has an exposed portion remaining after development.

As described above, the light blocking portion AS formed of the photo resist layer, when disposed on the object-side surface 2 or the image-side surface 3 of the second lens element L2, simplifies a manufacturing process over a light blocking portion formed of a metal layer using e.g., aluminum (Al) or chrome (Cr).

Specifically, the light blocking portion AS, when formed of the metal layer using e.g., aluminum (Al) or chrome (Cr), is less bondable to the UV curing polymer due to high hydrophobic characteristics, therefore requiring an additional bonding layer on the metal layer.

Meanwhile, the light blocking portion AS, when formed of the photo resist layer, is excellently bonded to the UV curing polymer owing to high hydrophilic characteristics of the photo resist, thus precluding a need for forming an additional metal layer on the photo resist layer.

Furthermore, a process of forming the light blocking portion AS as the metal layer entails sequential processes of exposure, and deposition and removal of the metal layer. On the other hand, a process of forming the light blocking portion AS as the photo resist layer only requires an exposure process due to characteristics of the photo resist, thereby reducing manufacturing costs and time.

Meanwhile, the metal layer using e.g., aluminum (Al) or chrome (Cr) has high reflectivity and thus light passed through the light blocking portion AS reflects unnecessary light reflected by other lens parts, consequently degrading resolution. The black photo resist layer generally has a high light absorption in a visible ray region, thus preventing degradation in resolution owing to total internal reflection.

In addition, the image sensor corresponds to an image plane IP, and is formed of a charge coupled device (CCD) or a complementary metal oxide semiconductor (CMOS) to sense an image of light passed through the first lens element L1, the second lens element L2 and the third lens element L3 and convert the image into an electrical signal.

In the meantime, an infrared ray filter and a cover glass corresponding to an optical low pass filter, a chromatic filter and a face plate may be installed behind the second lens LG2, but do not have a substantial effect on optical properties of the optical system of the present invention.

In the optical system of the present invention, the third lens element L3 has the image-side surface convexed toward the image plane at an optical axis and concaved toward the image plane at a peripheral portion thereof.

Accordingly, the optical system having the lens element configured as above is improved in resolution deterioration at the peripheral portion resulting from severe astigmatism at edges of an image, which occurs in a double convex lens. Also, such an optical system is reduced in severe TV distortion by 2% or less, which chiefly involves a meniscus lens having a concave object-side surface.

Moreover, as shown in FIG. 1, the second lens element L2 has the object-side surface 2 and the image-side surface 3 formed of a planar surface, respectively, but not limited thereto.

That is, in order to employ a general replica method which ensures easy mass production, the second lens element L2 may have the object-side and image-side surface formed of a planar surface, respectively. However, in a case where a general manufacturing method of a cemented lens is adopted, at least one of refractive surfaces (object-side surface and image-side surface) of the second lens element L2 may be formed of one of a spherical and aspherical surface. As described above, the refractive surfaces formed of one of a spherical and aspherical surface allow the optical system have more freedom in design and various superior optical properties.

Furthermore, in the optical system of the present embodiment, the light blocking portion blocking light incident outside an effective angle of view is disposed not as an additional instrument in an area other than the lens elements. Instead, the light blocking portion is disposed at the object-side surface 2 or the image-side surface 3 of the second lens element L2. This accordingly reduces height and weight of the lens element, thus advantageously allowing a smaller size and lighter weight optical system. The light blocking portion formed of a photo resist having a high light absorption prevents occurrence of ghost or flare due to internal reflection.

As shown in FIG. 1, in the optical system of the present embodiment, the first lens element L1 is bonded to the object-side surface 2 of the second lens element L2 and the third lens element L3 is bonded to the image-side surface 3 of the second lens L2.

Here, the second lens element L2 is formed of a glass material and the first and third lens elements L1 and L3 are formed using a replica method by depositing a polymer on the object-side and image-side surfaces of the second lens elements L2. This replica method allows the lens element to be manufactured in mass production.

Here, the first lens element L1 and the third lens element L3 are made of a high heat-resistant ultra violet (UV) curable polymer and the second lens element L2 is made of a glass material. Such lenses are superior in heat resistance to a plastic lens and are saved in manufacturing costs over a glass molding lens.

Also, in a case where the optical system is assembled to the camera module at a high temperature, the first and third lens elements L1 and L3 formed of a heat-resistant UV curable polymer, are prevented from being deformed by heat and subsequently altered in optical properties.

With this overall configuration, operational effects of conditions 1 and 2 will be described.

Condition 1 prescribes that the subminiature optical system of the present embodiment has at least one point satisfying $\Delta sag/\Delta r=0$, $$r>0.7*r_{S2} \quad \text{condition 1,}$$

where r is a radius on an optical axis, $r_{s2}$ is an effective radius of the image-side surface of the third lens element and sag is a height between the radius r and a length in an optical axis direction when a meeting point between the image-side surface of the third lens and the optical axis serves as the point of origin.

In a case where condition 1 is satisfied, when an image is imaged on the image plane of the image sensor, the subminiature optical system is prevented from resolution deterioration at a peripheral portion-due to increase in severe astigmatism of the image. Moreover, TV distortion equivalent to optical distortion ranging between 1 F and 0.6 F is reduced to 2% or less, thus further enhancing resolution quality.

In addition, condition 2 prescribes a light blocking portion AS disposed on the image-side surface of the second lens element L2:

$$r_{W2}-0.01<R<r_{S2'}-0.02 \quad \text{condition 2,}$$

where $r_{W2}$ is an effective radius of the image-side surface of the second lens element, R is a radius of a central hole formed in the light blocking portion, and $r_{S2'}$ is an r value greater than the effective radius when the image-side surface of the third lens element satisfies $\Delta sag/\Delta r=0$.

Here, when the central hole formed in the light blocking portion AS has a radius deviating from a lower limit of condition 2, i.e., too small a radius, the image is not partially imaged on the image plane, thus leading to poor resolution and darkening the peripheral portion of the image.

Meanwhile, when the central hole formed in the light blocking portion AS has a radius deviating from an upper limit of condition 2, i.e., too great a radius, light incident outside an effective angle of view cannot be blocked properly to result in severe flare.

FIG. 1 is a view illustrating a lens arrangement of the subminiature imaging optical system according to the first embodiment of the present invention, and FIGS. 2A to 2C show aberrations of the embodiment shown in FIG. 1, in which FIG. 2A is spherical aberration, FIG. 2B is astigmatism and FIG. 2C is distortion. In the following diagrams showing astigmatism, "S" represents sagital and "T" represents tangential.

In the first embodiment, an angle of view is 60 degrees, an F number FNo is 3.2 and an effective focal length is 1.09 mm.

In Table 1 blow, the unit for radius of curvature, and thickness or length is mm.

TABLE 1

| Surface No. | Radius of curvature R | Thickness or distance t | Refractive index $N_d$ | Abbe number $V_d$ | Note |
|---|---|---|---|---|---|
| *1 | 1.026009 | 0.175 | 1.4825 | 48.8 | First lens element |
| 2 | ∞ | 0.55 | | 65.4 | Second lens element |
| 3 | ∞ | 0.125 | 1.4825 | 48.8 | |
| *4 | −0.79268 | 1.0 | | | Third lens element |
| 5 | — | | | | Image plane |

In Table 1, *represents an aspherical surface, and in the first embodiment, the first surface (object-side surface of the first lens element L1) and the fourth surface (image-side surface of the third lens element L3) are aspherical.

As can be seen from the above embodiments, the subminiature imaging optical system with excellent aberrational characteristics as shown in FIGS. 2A to 2C is obtained according to the present invention.

As set forth above, according to exemplary embodiments of the invention, a lens element adjacent to an image plane has an image-side surface convexed toward the image plane near an optical axis and concaved toward the image plane at a peripheral portion. This prevents resolution deterioration at the peripheral portion resulting from severe astigmatism on edges of an image and reduces TV distortion, thereby considerably enhancing resolution of the optical system.

Moreover, first and third lens elements made of a heat resistant UV curable polymer are formed on an object-side surface and an image-side surface of a second lens element made of glass, respectively. This prevents lens shape and optical properties from being altered even in a high temperature assembly process, thereby ensuring stable optical properties of the optical system and producing a small-sized and low-cost optical system.

In addition, a ring-shaped light blocking portion is disposed at an image-side of the second lens element to effectively block light incident outside an effective angle of view and noticeably reduce flare.

While the present invention has been shown and described in connection with the exemplary embodiments, it will be apparent to those skilled in the art that modifications and variations can be made without departing from the spirit and scope of the invention as defined by the appended claims.

What is claimed is:

1. An imaging optical system comprising:
   a first lens element having a convex object-side surface;
   a second lens element having an object-side planar surface in contact with an image-side surface of the first lens element and an image-side planar surface; and
   a third lens element having an object-side surface in contact with the image-side surface of the second lens element,
   wherein the object-side surface of the first lens element and an image-side surface of the third lens element are aspherical, and the third lens element has a point of inflection formed within an effective aperture thereof such that the image-side surface is convexed toward an image plane at a central portion to have positive refractive power and concaved toward the image plane at a peripheral portion to have negative refractive power.

2. The imaging optical system of claim 1, wherein the first and third lens elements are formed of polymer by a replica process and the second lens element is formed of glass.

3. The imaging optical system of claim 1, wherein the first and third lens elements are formed of an ultra violet curing polymer.

4. An imaging optical system comprising:
a first lens element having a convex object-side surface,
a second lens element having an object-side surface in contact with an image-side surface of the first lens element; and
a third lens element having an object-side surface in contact with an image-side surface of the second lens element,
wherein the object-side surface of the first lens element and an image-side surface of the third lens element are aspherical, and the third lens element has a point of inflection formed within an effective aperture thereof such that the image-side surface is convexed toward an image plane at a central portion to have positive refractive power and concaved toward the image plane at a peripheral portion to have negative refractive power, and the second lens element has a light blocking portion disposed at the image-side surface.

5. An imaging optical system comprising:
a first lens element having a convex object-side surface;
a second lens element having an object-side surface in contact with an image-side surface of the first lens element; and
a third lens element having an object-side surface in contact with an image-side surface of the second lens element,
wherein the object-side surface of the first lens element and an image-side surface of the third lens element are aspherical, and the third lens element has a point of inflection formed within an effective aperture thereof such that the image-side surface is convexed toward an image plane at a central portion to have positive refractive power and concaved toward the image plane at a peripheral portion to have negative refractive power, and
wherein the second lens element has a filter disposed at one of the object-side surface and image-side surface of the second lens element.

6. The imaging optical system of claim 1, wherein the second lens element has a light blocking portion disposed at the image-side surface.

7. The imaging optical system of claim 1, wherein the second lens element has a filter disposed at one of the object-side surface and image-side surface of the second lens element.

* * * * *